Aug. 25, 1931.　　　　E. H. POLK　　　　1,820,321
DECK FOR TRUCKS, TRAILERS, AND THE LIKE
Filed March 12, 1930
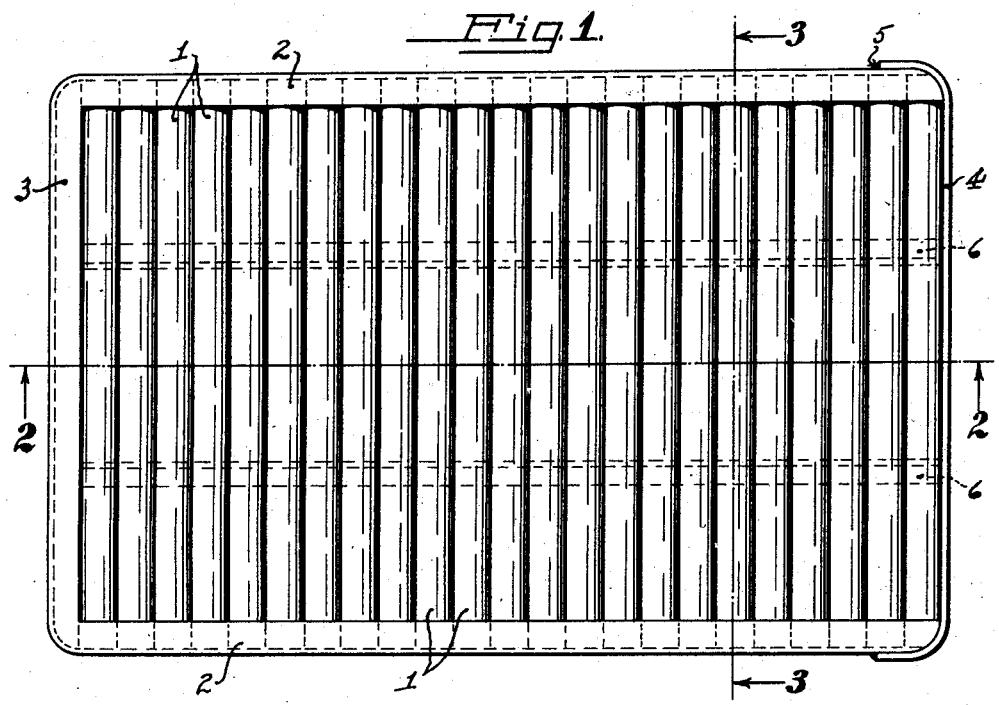
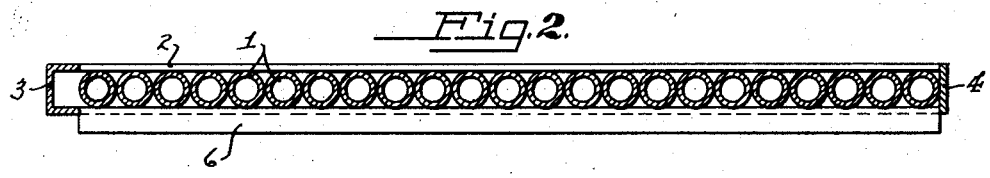
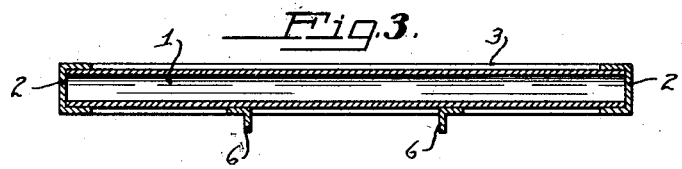
INVENTOR,
Edward H. Polk
BY Booth & Booth
ATTORNEYS.

Patented Aug. 25, 1931

1,820,321

UNITED STATES PATENT OFFICE

EDWARD H. POLK, OF SACRAMENTO, CALIFORNIA

DECK FOR TRUCKS, TRAILERS, AND THE LIKE

Application filed March 12, 1930. Serial No. 435,164.

The present invention relates to decks or platform beds especially adapted for industrial trucks, trailers and the like.

The principal object of the invention is to provide a heat resisting deck having insulating air spaces formed within it which is suitable for use in foundries and shops where hot castings and other objects must be transported from place to place. Another object is to provide a deck of great strength and rigidity and long life. A still further object is to provide a deck which can be manufactured cheaply from waste material such as scrap pipe or boiler tubes.

Although my invention is especially adapted for use upon trucks and trailers for the transportation of hot objects, it is also well adapted for use upon vehicles for other purposes such as freight or baggage trucks, and may be used to advantage for still other purposes.

The above and other objects and advantages of the invention will become apparent from the following description which should be read with the understanding that the form, construction and arrangement of the device may be varied within the limits of the claims hereto appended without departing from the spirit of the invention as expressed therein.

The preferred embodiment of the invention will now be described fully with reference to the accompanying drawings, wherein:—

Fig. 1 is a plan view of the device.

Fig. 2 is a longitudinal section taken on the line 2—2 of Fig. 1.

Fig. 3 is a transverse section taken on the line 3—3 of Fig. 1.

My deck is constructed of a plurality of tubular members 1 placed parallel and preferably contiguous to each other. The tubes 1 are held together by a suitable frame which I prefer to make of channel section steel bent into U-shape having side members 2 and an end member 3. The ends of the tubes 1 are fitted within the channels of the side members 2 and may be welded thereto if desired. The open end of the U-shaped frame is closed preferably by a flat bar 4 having its ends bent over the ends of the side members 2 and secured thereto by any suitable means such as welding, as indicated at 5. The ends of the tubes 1 may or may not be welded to the side members 2. For certain purposes, it may be sufficient to place the tubes within the channel members 2 without otherwise securing them in position than by means of the end members 3 and 4.

The deck may be secured to a truck, trailer or other support in any desired manner. For example, I have shown two longitudinally disposed angle bars 6 welded or otherwise secured to the bottoms of the tubes 1, and which may be used for supporting the deck in any desired manner.

It will be noted that my deck on account of its tubular construction is not only very stiff and rigid, but is also heat resisting on account of the air spaces within the tubes. It is not subject to buckling under the influence of extreme heat. By using scrap or waste material for the tubes 1, the deck can be made very cheaply, and is not subject to ordinary wear.

I claim:—

1. A deck for trucks, trailers and the like comprising a one-piece U-shaped frame, a plurality of tubular members extending across said frame with their ends engaging the side members thereof, and a bar extending across the open end of said frame and secured to said side members.

2. A deck for trucks, trailers and the like comprising a U-shaped frame of channel cross section having spaced longitudinal side members and a connecting end member, a plurality of transverse tubular members having their ends seated within the channels of the side members of said frame, and a bar extending across the open end of said frame and secured to said side members.

In testimony whereof I have signed my name to this specification.

EDWARD H. POLK.